United States Patent [19]
Springer

[11] 3,815,420
[45] June 11, 1974

[54] ALTITUDE ENCODER SYSTEM WITH FOOT MARKER RESET

[76] Inventor: Earl W. Springer, Box 220, Fairland, Ind. 46126

[22] Filed: Aug. 24, 1973

[21] Appl. No.: 391,073

[52] U.S. Cl. ................................................. 73/384
[51] Int. Cl. ............................................ G01c 21/00
[58] Field of Search............. 73/384, 386, 387, 4 R, 73/178 R; 340/27 A, 266, 190; 244/77 D

[56] References Cited
UNITED STATES PATENTS
3,513,708  5/1970  Springer............................ 73/384

*Primary Examiner*—Donald O. Woodiel
*Attorney, Agent, or Firm*—Hood & Coffey

[57] ABSTRACT

An altitude encoding system comprising a conventional altimeter having a 100 foot pointer and a pointer conventionally known as the foot marker, first electro-optical apparatus for tracking the movement of the 100 foot pointer and second electro-optical apparatus for finding the foot marker. The tracking apparatus and the finding apparatus include, respectively, first and second supports mounted for rotation about the axis of the altimeter with a 100:1 reduction gear arrangement drivingly connecting the second support to the first support. The reduction between the 100 foot pointer and the foot marker is 100:1 such that, when the first support moves with the 100 foot pointer, the second support moves with the foot marker. Stepping motors are provided for driving the supports as well as an encoder. The tracking apparatus and the finding apparatus include lights for projecting light at the paths of movement of the pointer and the foot marker and light-responsive cells for receiving the light reflected from the pointer and the foot marker. The finding apparatus is deactivated during the normal operation mode, i.e., the tracking mode. The tracking apparatus is deactivated during the finding mode, i.e., the setting and resetting mode. The activation and deactivation of these apparatus involves disconnecting their light sources and/or their light-responsive cells. During the resetting of the system, the finding apparatus is energized to find the foot marker. By driving the system to find the foot marker, I automatically set the tracking apparatus and the encoder at the proper altitude for continued tracking and encoding operations.

20 Claims, 10 Drawing Figures

PATENTED JUN 11 1974 3,815,420

ALTITUDE ENCODER SYSTEM WITH FOOT MARKER RESET

The present invention relates to altitude encoding systems, and more particularly to the provision of such a system including an automatic setting and resetting system. The system of my present invention includes means for finding the position of the conventional foot marker on an altimeter, thereby to position the encoder at the altitude at which the plane is flying as well as to position electro-optical means for tracking the 100 foot pointer of the altimeter. The system of the present invention includes an advantageous accessory to my basic system disclosed in my prior patents including my initial U.S. Pat. No. 3,513,708 issued May 26, 1970 and disclosing my basic encoding altimeter system including means for tracking the 100 foot pointer of a conventional aircraft altimeter. I refer to my other U.S. Pat. Nos. 3,553,546; 3,559,010; 3,618,058; 3,618,076; 3,626,748; and 3,713,340, all disclosing different features of my basic encoding altimeter system. In addition, I refer to my pending U.S. Pat. application Ser. No. 352,319 filed Apr. 18, 1973 and disclosing another type of reset system for my basic encoding altimeter system. The system disclosed in my pending U.S. Pat. application Ser. No. 352,319 includes an altitude transducer, in addition to the conventional altimeter, to provide a reference output used in the resetting of the system during tests or, for instance, after loss of power. The system of my present invention takes advantage of the fact that many altimeters are equipped with pointers, known as foot markers, which move only, for instance, 36° for an altitude change of 10,000 feet. A 36° movement of the 100 foot pointer, of course, represents an altitude change of 100 feet. By optically finding this foot marker, I can reset my system such that the light cells of the electro-optical tracking means will be bracketing the 100 foot pointer and the encoder will be encoding the proper altitude, i.e., the altitude at which the plane is flying.

My present invention, therefore, comprises an altimeter providing an axis about which first and second pointers move, the first pointer being the 100 foot pointer and the second pointer being the conventional foot marker, means for tracking the first pointer, and means for finding the second pointer. The tracking means includes plate means supported for rotation about the altimeter axis and adjacent the pointers, light source means and light-responsive means mounted on the plate means and cooperating electro-optically to determine when the first pointer moves, motor means for driving the plate means to keep the light source means and light-responsive means tracking the first pointer, an encoder drivingly connected to the motor means, and control means for the motor means. The control means includes first means operatively connecting the motor means to the light-responsive means so that the motor means is controlled by the light-responsive means during the tracking mode of operation. The finding means includes a support bracket mounted for rotation about the altimeter axis and adjacent the pointers, second light source means and second light-responsive means mounted on the support bracket and cooperating electro-optically to find the second pointer, i.e., the foot marker, and reduction means for drivingly connecting the bracket to the motor means to move the bracket about the axis in proportional relation to the movement of the plate means. Then, the control means includes second means for operatively connecting the motor means to the second light-responsive means to control the movement of the bracket and the plate means in response to the output of the second light-responsive means. In controlling the movement of the bracket and plate means during the finding mode, the second light-responsive means provides an output effective to stop the motor means when the foot marker has been found.

The control means of my present invention also includes means for transferring control of the motor means between the tracking apparatus and the finding apparatus. Generally speaking, the transferring means includes switch means such SCR's and relays and combinations thereof responsive to the outputs of the light-responsive cells to provide the necessary switching functions. Additionally, so that the pilot may reset the system, I provide a manually-operated switch as means for transferring the control of the motor means between the tracking apparatus and the finding apparatus.

Other objects and features of my present invention will become apparent as this description progresses.

To the accomplishment of the above and related objects, this invention may be embodied in the form illustrated in the accompanying drawings, attention being called to the fact, however, that the drawings are illustrative only, and that changes may be made in the specific construction illustrated and described, so long as the scope of the appended claims is not violated.

Figure 1:
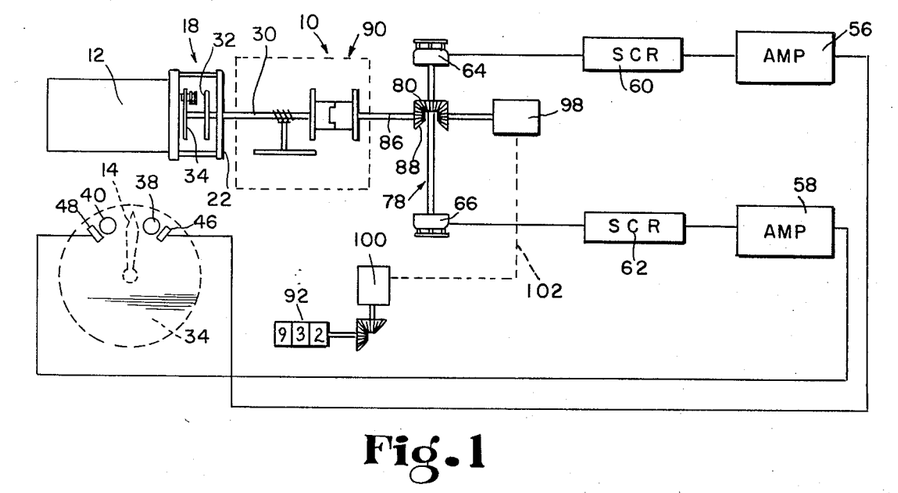
FIG. 1 is a diagrammatical view of my basic encoding altimeter system.

Referring now to FIG. 1, it will be seen that I have illustrated, in block diagram form, my basic altitude encoding system disclosed in my U.S. Pat. No. 3,513,708. The system 10 comprises a standard aircraft altimeter 12 which is equipped with an indicator or pointer 14, called the 100 foot pointer, mounted for pivotal movement about the axially extending center axis of the altimeter and means, indicated generally by the reference numeral 18, for tracking the movement of the indicator 14. I sometimes refer to the means 18 as the reader. The altimeter 12 has a glass cover plate covering and protecting the indicator 14 and a scale about which the indicator moves. One complete revolution of the indicator 14 represents 1,000 feet. The tracking means 18 is arranged to track the movement of the indicator 14 by projecting and reflecting light through the cover plate of the altimeter.

The tracking means 18 is mounted in front of the cover plate to be in alignment with the pivotal axis of the indicator 14. I mount a support plate 22 adjacent the front face of the altimeter, the support plate 22 carrying a centrally located bearing defining a journal axis coinciding with the axis of the altimeter about which the indicator 14 moves.

The tracking means 18 comprises a shaft 30 journalled in the support plate 22 bearing and a slip ring disc 32 and support plate or plate means 34 are mounted on the shaft 30 for rotation therewith. I provide a pair of light sources 38, 40 (exciter lamps 38, 40) mounted on the support plate 34 to direct light through the cover plate of the altimeter toward the path of movement of its indicator 14. A light-responsive device 46, 48 is associated with each light source 38, 40, the light-responsive surface of each device facing the path of movement of the indicator 14. Each device 46, 48 electrically changes state when the amount of light impinging thereon changes to a predetermined degree. For reasons to be discussed hereinafter, I prefer to use photosensitive resistor cells as the light-responsive devices 46, 48. Since I project light at the path of movement of the indicator 14, when the indicator moves adjacent to one of the light-responsive devices 46, 48, the indicator will reflect light back toward the device to cause it to change state. In my presently preferred system, such impingement of light will cause the resistance very significantly to decrease. In my U.S. Pat. No. 3,513,708, I disclose the use of light-responsive devices of the type, for instance, which generate a potential when light impinges thereon. Such devices are conventionally used with amplifiers such as indicated at 56, 58, each amplifier being coupled to the gate control electrode of an SCR 60, 62. Each SCR is, in turn, connected to and arranged to energize a rotary stepping motor 64, 66, the rotary stepping motors 64, 66 comprising motor means or drive means for the support plate 34 on which the light sources 38, 40 and devices 46, 48 are mounted.

It will be appreciated that, when the indicator 14 moves close to the device 46 and reflects light thereupon, the motor 64 will be energized to drive the support plate 34 on which the device 46 is mounted about the axis of the shaft 30. When the indicator 14 moves close to the device 48, the motor 66 will be energized to drive the support plate 34 in the opposite direction. Each motor 64, 66 drives the support plate 34 in a step-by-step manner, motor 64 driving the plate in steps in one direction and motor 66 driving the plate in steps in the opposite direction. As explained in my prior U.S. Pat. No. 3,513,708, the stepping motors 64, 66 are controlled by the outputs of the devices 46, 48 to keep the devices bracketing the indicator 14. Diagrammatically, I show a common shaft means 78 between the motors with a bevel gear 80 on the shaft means 78 drivingly connecting a shaft 86 to the motors through another bevel gear 88. The shaft 86 is an input shaft for an encoder 90, the preferred structure of which is disclosed also in my U.S. Pat. No. 3,618,058. In the system of my present invention, I make some modification of the encoder in that I provide a switching operation drivingly connected to one of the output shafts of the encoder. In the illustration, the shaft 86 is directly coupled through the encoder 90 to the shaft 30.

In addition, in FIG. 1, I show a decimal counter and a synchro transmitter 98 and a synchro receiver 100 electrically connected as indicated at 102. The transmitter 98 is drivingly connected to the shaft means 78. The receiver 100 is drivingly connected to the counter 92 which preferably is placed in a pilot's control in the instrument panel of the aircraft. The counter 92 will provide a numerical display of the altitude being encoded and transmitted to ground stations.

Figure 2:
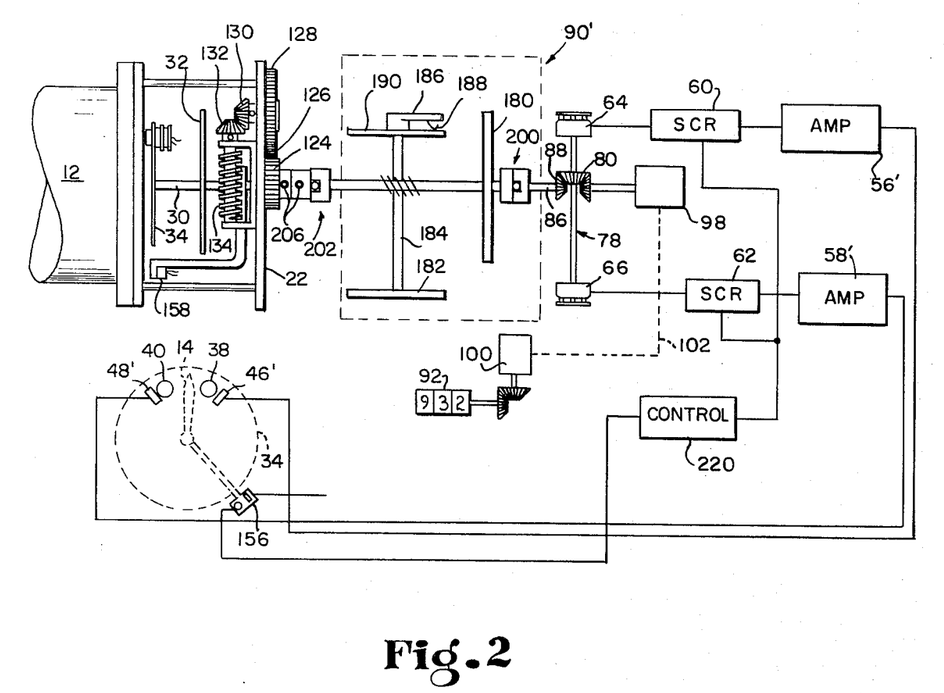
FIG. 2 is a diagrammatical view of my basic system with the finding apparatus included therein.

In FIG. 2, I show a block diagram of the system of the present invention which includes, in addition to the basic system illustrated in FIG. 1, automatic setting and resetting features. Like reference numerals, of course, represent like parts. Further, with reference to FIG. 2, I show the light-responsive devices 46', 48', amps 56', 58' connected, respectively, to the devices 46', and 48' and SCR's 60, 62. As indicated above, some types of light-responsive devices require amplifiers. I presently am able to use a photo-sensitive resistor cell, one side of which is connected to an 18 volt regulated source and the other side of which is connected through a potentiometer network and a diode to the gate control electrode of the SCR 60, 62. Thus, in FIG. 2, the amps 56', 58' may be replaced by a potentiometer network as will be discussed in conjunction with FIG. 10.

In addition, the system illustrated in FIG. 2 is designed to track or to find, in the setting and resetting activity, the conventional foot marker on the altimeter. Such a foot marker is indicated at 120 in FIGS. 3 and 4.

Figures 3, 4, 6:
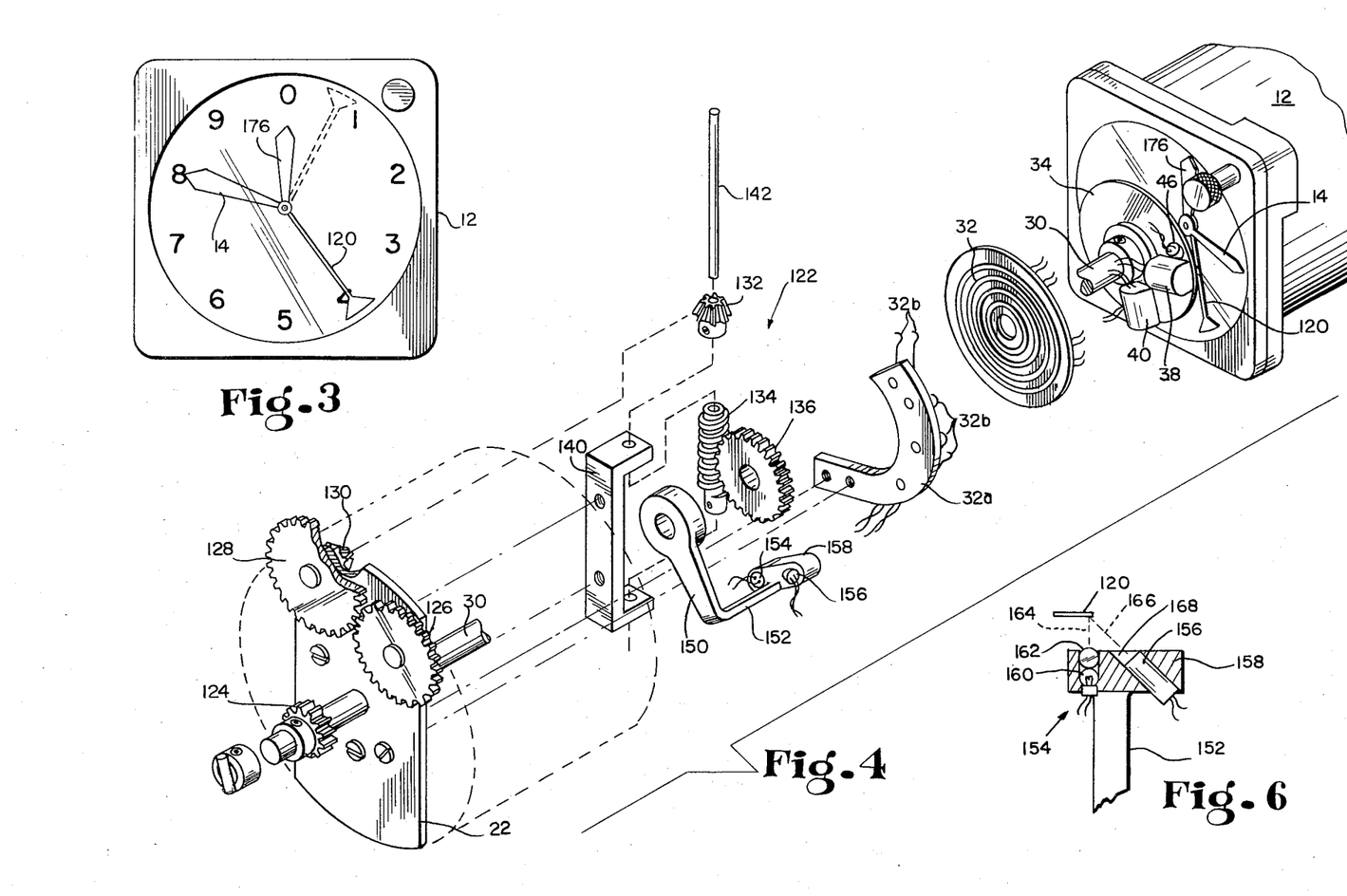
FIG. 3 is an elevational view of the face of a conventional altimeter showing the 100 foot pointer, 1,000 foot pointer and foot marker.
FIG. 4 is an exploded perspective view of the electro-optical means for tracking the 100 foot pointer as well as the electro-optical means for finding the foot marker.
FIG. 6 is a fragmentary sectional view showing the optics of the finding apparatus.
Figure 5:
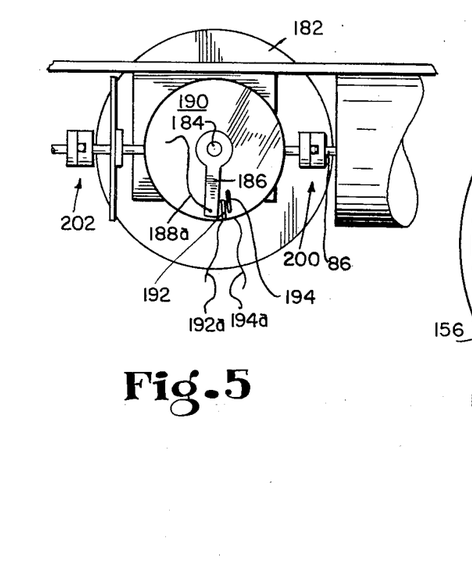
FIG. 5 is a fragmentary elevational view of a portion of my system showing limit switches on the encoder and particularly on the 500 foot disc portion of the encoder.
Figure 7:
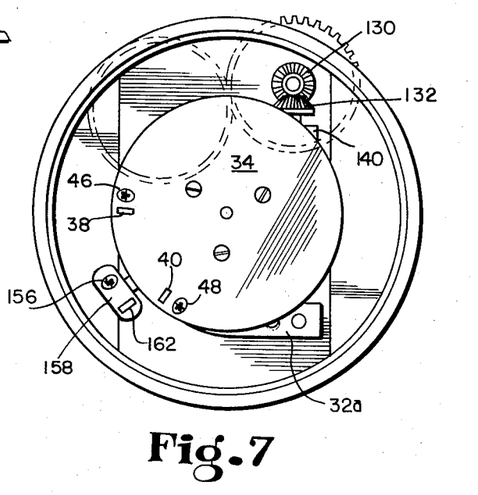
FIG. 7 is a view of the tracking and finding apparatus as viewed from the face of the altimeter.

This second pointer (foot marker 120) has a movement which is related to the pointer 14 on a 100:1 basis. One-half revolution of the foot marker 120 represents, for instance, an altitude change of 50,000 feet. One-half revolution of the pointer 14 represents an altitude change of 500 feet. For reasons clearly explained in my prior U.S. Pat. No. 3,513,708, tracking the movement of the pointer 14, i.e., the 100 foot pointer, is a necessity because of the requirement for reporting the altitude within ± 100 feet.

In order to reset my reader or tracking means 18, for instance, if power is lost or for testing purposes, I provide means 122 for tracking the foot marker 120 or, perhaps, more particularly for finding the position of the foot marker 120. Referring to FIGS. 2–7, it will be seen that my means 122 for tracking or finding the position of the foot marker 120 comprises a gear 124 mounted on the shaft 30 for rotation therewith, i.e., for rotation with the support plate means 34 which tracks the pointer 14. A pair of spur gears 126, 128 are journal mounted on the mounting plate 22 and meshed together and driven by gear 124 to provide a 2:1 gear reduction. The gear 128 drives a bevel gear 130 which, in turn, drives a bevel gear 132 which is mounted for rotation with a worm 134. A worm gear 136 is engaged with the worm 134 to rotate about the axis of the shaft 30 and relative to the shaft 30. The worm 134 and worm gear 136 provide a reduction of 50:1. Thus, the total reduction between the shaft 30 and the worm gear 136 is 100:1 which corresponds to the reduction ratio between the pointer 14 and the foot marker 120. In the illustrative and preferred embodiment, the worm 134 is supported on a bracket 140 by means of a shaft 142 to the upper end of which the bevel gear 132 is conventionally pinned by means of a set screw.

A radially extending arm 150 is attached to the worm gear 136 for rotation therewith relative to the shaft 30, the distal portion 152 of the arm extending axially toward the cover plate of the altimeter 12. Mounted on this distal portion 152 is a light source means 154 and light-responsive means 156. Particularly, there is a head 158 on the distal portion 152 with a lamp 160 projecting light transaxially through a clear glass or plastic cylinder 162 to provide a radially extending sheet of light indicated at 164 (FIG. 6) which is to be reflected back as indicated at 166 toward the light-responsive means 156. The light-responsive means may preferably be a cylindrically-shaped photo-resistive cell disposed in a bore located at a 45° angle as illustrated in FIG. 6. Reference is made to FIGS. 23-25 of my U.S. Pat. No. 3,513,708 which discusses the projection of light through such a glass or clear plastic cylinder 162 to provide a sheet of light for reflection by an object such as a meter pointer. I have found that placing the bore 168 receiving the cell 156 at an angle of 45° provides a proper light definition for significantly reducing the resistance of the photo-resistive cell when the sheet of light 164 is reflected backwardly as indicated at 166.

While altimeters are also conventionally provided with 1,000 foot markers, as indicated at 176 in FIG. 3, it will be understood that my reader or tracker 18, as well as my means 122 for tracking the foot marker, does not involve the 1,000 foot pointer. Such a pointer is merely used in conjunction with the 100 foot pointer by pilots for visual observation. In FIG. 3, I show the 1,000 foot pointer 176 pointed toward zero with the 100 foot pointer pointed toward 8. In solid lines, I show the foot marker 120 almost at the number 4. That would provide a pilot the information he is flying at 38,000 feet. I then show the foot marker in dashed lines almost at the 1 position which would indicate to the pilot he is flying at 9,800 feet. It will be apparent, therefore, that by finding the foot marker 120, I can bracket the pointer 14 between my photo-resistive cells 46, 48. In driving the tracking means 18 upwardly to the point that I can get light reflected from the foot marker back on the cell 156, I am driving the encoder 90 to its proper altitude setting corresponding with the position of the pointers 14, 120, 176.

In other words, during the regular mode of operation of my system, the encoder 90, 90' is driven along with the support plate 34 to track the 100 foot pointer 14. Every time the pointer 14 moves more than 36° or 100 feet of altitude, the encoder moves to a new angular position along with the support plate 34 to be transmitting a different altitude code. Since the arm 150 is drivingly connected to the support plate 34 (shaft 30) by means of a 100:1 reduction gearing arrangement, the light source means 154 and light cell 156 will track the foot marker 120. During the regular operation of my system, of course, the motors 64, 66 are controlled by the output of the cells 46, 48. As will be more fully discussed hereinafter, the motors 64, 66 are controlled by the output of the cell 156 during the up slue in that once the reader is driven upwardly to its desired position corresponding to the position of the foot marker 120, the up slue is stopped and the control of the motors 64, 66 is transferred back to the cells 46, 48.

My preferred encoder structure is shown in my said prior U.S. Pat. No. 3,513,708. The preferred encoder includes a 100 foot disc 180 and a 500 foot disc 182 drivingly connected to the 100 foot disc by means of a worm gear and intermittent motion mechanism discussed in my said prior patent. One revolution of the 500 foot disc, which is mounted on the shaft 184 shown in the drawings (FIGS. 2 and 5), corresponds to an altitude change of 50,000 feet. I place an arm 186 on the shaft 184 to rotate with the shaft and a contact 188 on the distal end of that arm. A wire 188a leads away from the contact 188 to provide an electrical connection to that movable contact. A stationary disc 190 is provided carrying contacts 192 and 194 best seen in FIG. 5. Wires 192a, 194a lead away from, respectively, the contacts 192, 194. As will be more fully discussed in conjunction with FIG. 8, one of the contacts 192, 194 serves as a down limit switch while the other serves as the up limit switch. I provide an up limit switch because the wiring running to the light-source means 154 and light cell 156 is not connected through any slip ring assembly since it is only necessary for the arm 150 to move through 180° for an altitude change of 50,000 feet. If, during the up slue to reset my system, the electro-optical means on the arm 150 fails to stop the system at the position of the foot marker, the up limit switch will stop the system and save the wiring running to the light 154 and cell 156.

For conventional mechanical purposes, I use misalignment couplings 200, 202 at each side of the encoder 90'. I also connect the gear 124 to the shaft 30 by means of a set screw 206 which permits me properly to align the arm 150 relative to the support plate 34 before I tighten the set screw 206.

In FIG. 4, I also show a connector block 32a which is securely mounted on the support plate 22 and which has contacts 32b which engage, respectively, the circular and concentric contact strips on the slip ring disc 32.

In FIG. 2, I show control means 220 operatively connected between the cell 156 and the motor means 64, 66, and particularly between the cell 156 and the SCR's 60, 62. The details of this control means 220 will now be discussed in conjunction with FIGS. 8, 9 and 10.

Figure 8:
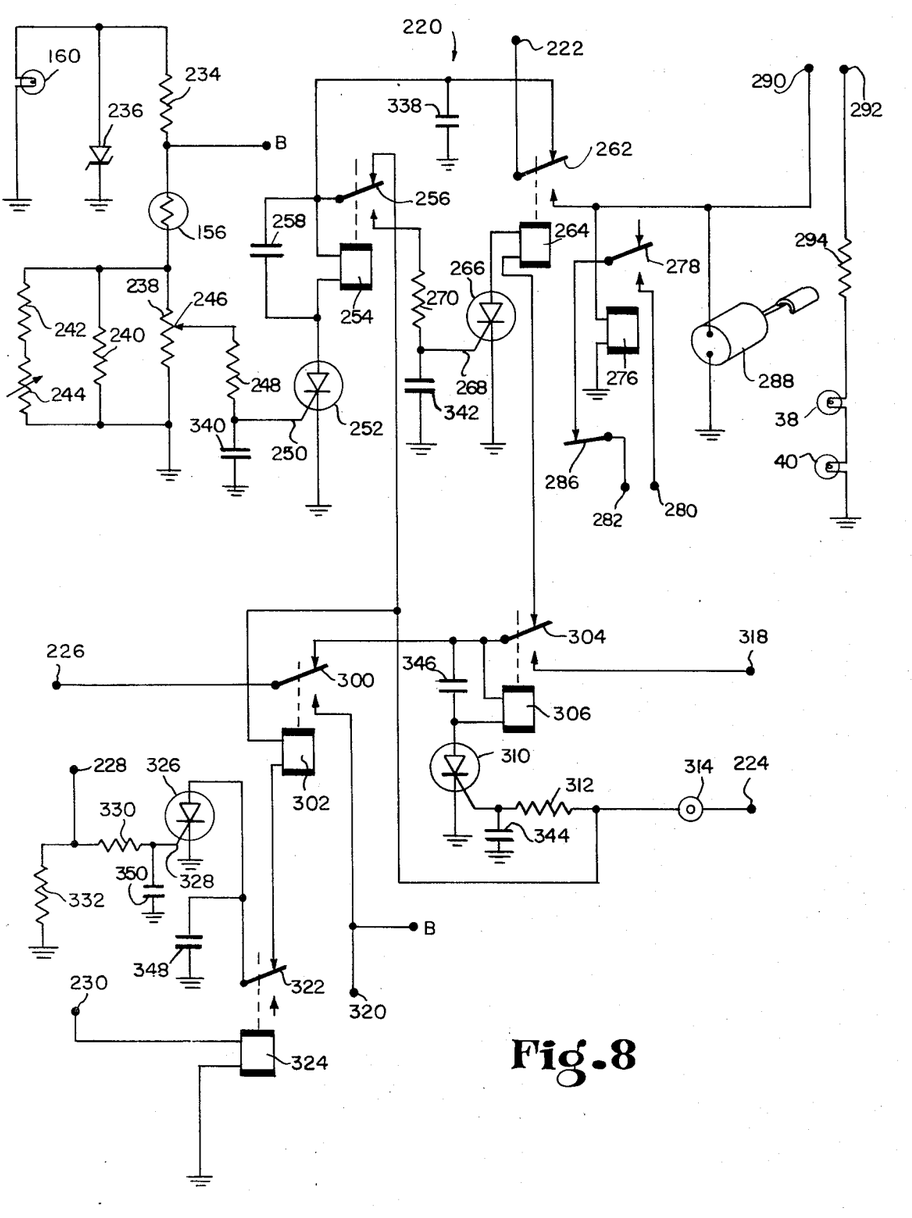
FIGS. 8-10 are schematic diagrams of my control circuitry.

Turning first to FIG. 8, it will be seen that I have shown several terminals 222, 224, 226, 228, 230 which are input terminals for an 18 volt regulated source. The rest of the circuitry will be described with reference to these voltage input terminals.

The light 160 for the light source means 154 is illuminated by current flow through a 100 ohm resistor 234 from a point B which is contacted to the voltage input terminal 226 as will be discussed hereinafter. There is a zener diode 236 limiting the voltage on the light 160 to 5.1 volts. The photo-resistive cell 156 is connected directly to the point B so that current flows through that cell 156 and a 20 K potentiometer 238, in parallel with which is connected a 2.2K resistor 240. In parallel with the resistor 240 is a series circuit consisting of a 1 K resistor 242 and a thermistor 244 used for temperature compensation. The wiper 246 of the pot 238 is connected through a 10 K resistor 248 to the gate control electrode 250 of an SCR 252 which controls the flow of current through a relay 254 having a contact 256. There is a 47 microfarad capacitor 258 connected across the coil of relay 254 as illustrated. When the SCR 252 is rendered conductive, current can flow through the coil of the relay 254 from the terminal 222 through the contact 262 of a relay 264. Current flow through the relay 264 is controlled by an SCR 266, the gate control electrode 268 of which is connected through a 10 K resistor 270 to the contact assembly of the relay 254. Particularly, when the relay 254 pulls in its contact 256, current can flow to the gate control electrode 268 to render the SCR 266 conductive. The timing of this action will be discussed in detail hereinafter.

When the relay 264 pulls in its contact 262, that energizes a relay 276 by current flow from the terminal 222 to pull in its contact 278. The contact 278, when pulled in or closed, connects the encoder 90 to the transponder in the aircraft. The operation of a transponder is discussed in my prior U.S. Pat. No. 3,513,708. I show wiring points 280, 282 which lead to the encoder. I show also an on-off switch 286 which the pilot may use to turn the encoder off, i.e., to prevent transmission of the encoded signals, if the pilot so chooses. Energization of the relay 264 also energizes the solenoid-operated flag 288 which preferably is used in the pilot's control to cover the numerical display device 92. Still further, energization of the relay 264 provides current flow to the points 290, 292 shown in FIG. 9 and discussed hereinafter. Current flow from the point 292 is through a resistor 294 to the reader or tracker 18 exciter lamps 38, 40. In other words, when the relay 264 is pulled in, the tracker is activated for following the pointer 14.

The current for energizing relay 264 flows from input terminal 226 through a contact 300 of a relay 302 and a contact 304 of a relay 306. The relay 306 is energized by current flow from the input terminal 226 when its controlling SCR 310 is rendered conductive. The gate electrode of SCR 310 is connected through a resistor 312 and a press-to-test switch 314 to the voltage input terminal 224. When a pilot decides to test my system or to reset it, he can close the switch 314 to render the SCR 310 conductive to energize relay 306 to pull in its contact 304 to provide the voltage on the input terminal 226 at the point 318. This point 318 is connected to the SCR controlling the motor which drives the encoder and support plate 34 downwardly for the down slue cycle. The point 320 is provided as the point which is connected to the SCR controlling the motor which drives the encoder and support plate 34 upwardly during the up slue cycle. The up slue is initiated when the relay 302 is energized to pull in its switch 300 to connect the voltage terminal 226 to the point B as well as to the point 320. In other words, the current for turning on the lamp 160 and application to the photo-resistive cell 156 is applied through the contact 300 of the relay 302. The relay 302 is energized through a contact 322 of a relay 324 and through an SCR 326, the gate control electrode 328 of which is connected through a 10 K resistor 330 to the voltage input terminal 228 discussed previously. There is a 22 K resistor 332 between the point 222 and ground as illustrated.

The relay 324 is connected to the input terminal 230 discussed previously. These two input terminals 228, 230 are operatively connected to the voltage source, respectively, by the wires 192a, 194a leading to the contacts 192, 194 of the limit switch arrangement discussed primarily in conjunction with FIG. 5, i.e., the limit switches which are driven by the same shaft as the 500 foot disc of the encoder to stop the down slue and the up slue. When the down limit is reached, the 18 volt regulated source is applied to the gate electrode 328 of the SCR 326 to energize the relay 302 to start the up slue. If the operation of the light source means 154 and light-responsive means 156 (light cell 156) fails to stop the up slue by finding the foot marker 120, the up slue will continue until the 18 volt source is applied by the contacts 194 (input terminal 230) to the relay 324 to open the circuit to the relay 302.

In recapitulation, to this point, it will be seen that the down slue may be started by the pilot pressing the switch 314 to energize the relay 306. The up slue is started automatically at the completion of the down slue by energization of the relay 302.

Throughout the circuit shown in FIG. 8, there are several capacitors conventionally located for conventional purposes. There are capacitors 338, 340, 342, 344, 346, 348, 350 in the circuitry. Capacitors 338 and 346 are 0.47 microfarad capacitors while the rest of the capacitors just mentioned are 0.01 microfarad capacitors.

In the up slue mode, when the light from the lamp 160 is reflected back upon the photo-resistive cell 156 by the foot marker 120, the first thing that happens is that the SCR 252 is turned on to energize relay 254. Because of the 47 microfarad capacitor 258 and the time it takes to charge it up, that relay 254 is not going to be too fast in pulling in its contact. In this relatively slow interval, a number of things happen in the following order. First, relay 302 will function and stop the up slue as soon as the contact 256 for relay 254 pulls in to open up the circuit to the relay 302. After relay 302 has stopped the up slue, it takes a little time for its contact to move back to its normal illustrated position. When the contact of relay 302 gets back to its normal position, then voltage or current can be supplied to relay 264 through the contacts 300, 304 for the relays 302, 306. That will permit, then, relay 264 to be energized by relay 254. As stated previously, when relay 264 is pulled in by the relay 254, the power is removed from relay 254 by lowering the contact 262. Relay 254 will stay energized (its contact 256 will stay in) for a period of time because of the 47 microfarad capacitor which will be leaking through the coil of the relay keeping the relay energized. After the capacitor 258 is discharged, the contact 256 will go to its normal illustrated position. The 47 microfarad capacitor 258, therefore, keeps the relays 254 and 264 from oscillating.

Figure 9:
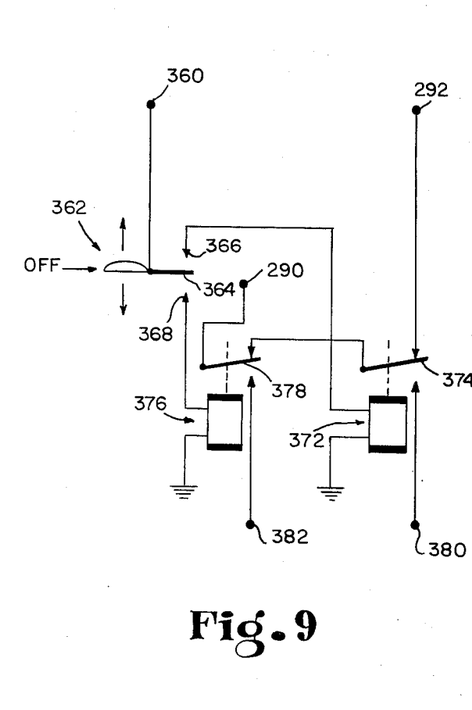

Turning now to FIG. 9, it will be seen that the points 290, 292 providing current flow through the resistor 294 and lamps 38, 40 (FIG. 8) are identified. The circuit shown in FIG. 9 includes an 18 volt regulated voltage input terminal 360 which is connected to a pilot's control switch 362 having a movable contact 364 and fixed contacts 366, 368. The movable contact 364 is spring loaded to its center-off position. When the pilot wants to start an up slue, he pulls upwardly on the lever to connect the voltage source to the contact 368. When he wants to start a down slue, he pushes down on the lever to connect the voltage source to the contact 366. The voltage on the contact 366 energizes a relay 372 having a contact 374. The voltage on the contact 368 energizes a relay 376 having a contact 378. When the relay 372 is energized to pull in its contact 374, it will apply the voltage on the point 290 to a down slue terminal 380 which is connected to the gate electrode of the SCR which controls the motor driving the encoder and support plate 34 downwardly. Conversely, when the relay 376 pulls in its contact 378, the voltage on the point 290 is fed to an up slue terminal point 382 which is operatively connected to the gate electrode of the SCR controlling the motor which drives the encoder and support plate upwardly. Thus, a pilot or a technician checking out the altimeter system, can drive the encoder system through its range of altitude positions for test purposes simply by operating the switch 362. That is, my system can be exercised through its altitude range without connecting a vacuum pump to the static system of the plane. Since the energization of either relay 376, 372 will open the circuit between the points 290, 292, it will be appreciated that the lamps 38, 40 will be turned off during the manual sluing operation.

Figure 10:
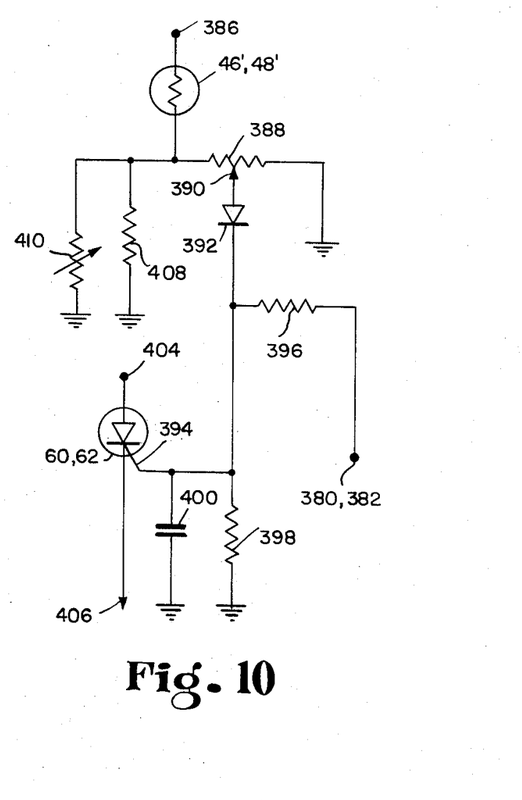

Turning now to FIG. 10, it will be seen that I have shown a circuit for connecting each light-responsive means 46', 48' to its associated SCR 60, 62. As stated previously, I prefer now to use a photo-resistive cell, the resistance of which drops significantly in the presence of light. This cell is connected between an input voltage terminal 386 and a potentiometer 388, the wiper 390 of which is connected through a diode 392 to the gate electrode 394 of the SCR 60, 62. It will be appreciated that the terminals 404, 406 of the SCR 60, 62 may be connected in the motor circuit in a conventional manner such that when the SCR is rendered conductive, current can flow through the motor. Alternatively, the SCR's 60, 62 may energize relays which, in turn, energize the motors. The points 380, 382 discussed in conjunction with FIG. 9 may also be connected through a 10 K resistor 396 to the gate electrode 394. The diode 392, of course, serves to isolate the sluing signals from the cell 46', 48'. Another 10 K resistor 398 is connected between the gate electrode 394 and ground and a 0.01 microfarad capacitor 400 is also connected between that electrode and ground for conventional purposes. The cell 46', 48' is compensated by means of a 1 K resistor 408 and a thermistor 401 which normally is a 3 K resistor at 25° C.

Importantly, referring to FIGS. 8 and 9, the electro-optical means for tracking or finding the foot marker is operative only during the up slue mode, i.e., when the light source means 154 and light-responsive means 156 is being moved clockwise to find the foot marker 120. That is the time when the relay 302 is energized to apply the voltage source to point B used to energize the light 160 and the light-responsive means or photo cell 156. Since the tracker for the foot marker 120 is operative in only one direction, being driven clockwise during the up slue mode, I do not need to use precision gearing or anti-backlash gearing in the reduction gearing.

In other words, while the head 158 of the arm 150 does track or stay with the foot marker 120 during the normal operation of my system, i.e., when the tracking means 18 is tracking the pointer 14, the electro-optical means carried by the head 158 is not operative to project light at the foot marker 120 to have that light reflected back to the cell 156 during normal operation. The electro-optical means carried by the head 158 is operative only when the system is being driven upwardly and it occurs only for the purpose of finding the foot marker 120 so that the devices 46', 48' will be bracketing the pointer 14 and the encoder 90 will be encoding the altitude at which the plane is flying.

The output of the cell 156 does, therefore, control or dominate the motor means which drives the encoder 90 and support plate 34 during the up slue mode. Particularly, the output of the cell 156 is effective to stop the motor means 64, 66 to stop the up slue at the proper altitude position. Then, control of the motor means is transferred over to the electro-optical means of the tracking means 18. The circuitry discussed in conjunction with FIG. 8, of course, is one such means for transferring the control of the motor means between the electro-optical means of the tracker means 18 and the electro-optical means on the arm 150. The transfer begins, as discussed previously, when the resistance of the cell 156 drops significantly so that a sufficient gate current can be applied to the SCR 252 to energize the relay 254.

It will be appreciated that the relays and SCR's in my system are switch means for closing or opening circuits. Within this description, and in the appended claims, the term "switch means" is intended to refer to means for opening or closing circuits including relays, SCR's, and combinations of relays and SCR's as well as manually-operated switches. Generally speaking, therefore, my invention comprises circuit means including first switch means for deactivating the lights 38, 40 and the cells associated therewith and starting the sluing of the plate 34 and encoder 90 downwardly to a predetermined altitude reference point, second switch means for starting the sluing of the plate 34 and encoder 90 upwardly from the reference point and, at the same time, activating the light 160 and cell 156 to find the foot marker 120, and third switch means responsive to the light cell 156 to stop the upward sluing action when the foot marker is found and, at the same time, reactivating the lights 38, 40 and the cells associated therewith. In the illustrative embodiment, the first switch means includes, for instance, switch 314, SCR 310 and relay 306 which opens the circuit to relay 264; the second switch means includes the relay 302, SCR 326, as well as the switch arm 186 which defines the point at which the downward slue is stopped; and the third switch means includes the SCR 252 and relay 254 which are energized by current flow through the cell 156 to energize the relay 264.

I claim:

1. An altitude encoding system comprising an altimeter providing an axis about which first and second pointers move, said first pointer being the 100 foot pointer and said second pointer being the conventional foot marker, means for tracking said first pointer, said tracking means including plate means supported for rotation about said axis and adjacent said pointers, light source means and light-responsive means mounted on said plate means and cooperating electro-optically to determine when said first pointer moves, motor means for driving said plate means to keep said light source means and light-responsive means tracking said first pointer, an encoder drivingly connected to said motor means, control means for said motor means, said control means including first means operatively connecting said motor means to said light-responsive means, a support bracket mounted for rotation about said axis adjacent said pointer, second light source means and second light-responsive means mounted on said support bracket and cooperating electro-optically to find said second pointer, and reduction means for drivingly connecting said bracket to said motor means to move said bracket about said axis in proportional relation to the movement of said plate means, said control means including second means for operatively connecting said motor means to said second light-responsive means to control the movement of said bracket and plate means in response to the output of said second light-responsive means.

2. The invention of claim 1 in which said reduction means includes 100:1 reduction gear means drivingly connecting said bracket to said plate.

3. The invention of claim 1 in which said second light source means is arranged to project light at the path of movement of said second pointer and said second light-responsive means is arranged to receive light reflected from said second pointer, said plate means including a circular plate, said support bracket including a portion disposed radially outwardly from said axis at a distance greater than the diameter of said plate, said plate being disposed between said bracket and said altimeter, and said second light source means and second light responsive means being carried by said bracket portion.

4. The invention of claim 3 in which said reduction means includes a worm and worm gear, said worm gear being mounted for movement about said axis and said bracket being connected to said worm gear for movement therewith.

5. The invention of claim 1 in which said encoder includes a 100 foot disc movable with said plate means and a 500 foot disc drivingly connected to said 100 foot disc by reduction means such that one complete revolution of said 500 foot disc corresponds to an altitude change of 50,000 feet, limit switch means associated with said encoder and including a contact movable with said 500 foot disc to provide an electrical signal output effective to stop movement of said bracket above a predetermined high altitude reference point and below a predetermined low altitude reference point.

6. The invention of claim 1 in which said control means includes means for transferring control of said motor means between said first and second means, said transferring means including first switch means for deactivating said first mentioned light source means and light-responsive means and starting said motor means sluing said plate means and encoder downwardly to a predetermined low altitude reference point, second switch means for starting said motor means sluing said plate means and encoder upwardly from said low altitude reference point and activating said second light source means and second light-responsive means to find said second pointer, and third switch means responsive to said second light-responsive means to stop such upward sluing when said second pointer is found and reactivating said first mentioned light source means and light-responsive means.

7. The invention of claim 1 in which said control means includes means for transferring control of said motor means between said first and second means.

8. The invention of claim 6 in which said encoder includes a 100 foot disc movable with said plate means and a 500 foot disc drivingly connected to said 100 foot disc by reduction means such that one complete revolution of said 500 foot disc corresponds to an altitude change of 50,000 feet, limit switch means associated with said encoder and including a contact movable with said 500 foot disc to provide an electrical signal output effective to stop movement of said bracket below said low altitude reference point and above a high altitude reference point.

9. An altitude encoding system comprising an altimeter providing an axis about which a 100 foot pointer and a foot marker revolve, a support plate journalled for rotation about said axis and adjacent said pointer, a support bracket mounted for rotation about said axis and adjacent said pointer, 100:1 reduction means drivingly connecting said bracket to said plate, motor means for driving said plate about said axis, an encoder having an input shaft drivingly connected to said motor means for movement corresponding to movement of said plate, light source means and light-responsive means mounted on said plate and cooperating electro-optically to determine when said 100 foot pointer moves by providing electrical outputs representative of such moves, circuit means for operatively connecting said light-responsive means to said motor means to cause said motor means to drive said plate to keep said light source means and light-responsive means tracking said 100 foot pointer, second light source means and second light-responsive means mounted on said support bracket and cooperating electro-optically to find said foot marker, said circuit means including means for operatively connecting said second light-responsive means to said motor means, the last said means cooperating with said motor means to stop said plate and encoder at the altitude position of said foot marker so that said first mentioned light source means and light-responsive means can track said 100 foot pointer.

10. The invention of claim 9 in which said circuit means includes first switch means for deactivating said first mentioned light source means and light-responsive means and starting said motor means sluing said plate and encoder downwardly to a predetermined low altitude reference point, second switch means for starting said motor means sluing said plate and encoder upwardly from said reference point and activating said second light source means and second light-responsive means to find said foot marker, and third switch means responsive to said second light-responsive means to stop such upward sluing when said foot marker is found and to reactivate said first mentioned light source means and light responsive means so that they can track said 100 foot pointer.

11. The invention of claim 9 in which said circuit means includes switch means responsive to said second-light responsive means when said foot marker is found to stop the driving of said plate and to activate said first mentioned light source means and light-responsive means so that they can track said 100 foot pointer.

12. The invention of claim 9 in which said circuit means includes switch means for starting said motor means sluing said plate and encoder upwardly from said reference point and activating said second light source means and second light-responsive means to find said foot marker.

13. The invention of claim 9 in which said first mentioned light source means and light-responsive means are arranged to project light at the path of movement of said 100 foot pointer and to receive and respond to light reflected from said pointer and said second light source means and second light-responsive means are arranged to project light at the path of movement of said foot marker and to receive and respond to light reflected from said foot marker.

14. The invention of claim 13 in which said circuit means includes first switch means for deactivating said first mentioned light source means and light-responsive means and starting said motor means sluing said plate and encoder downwardly to a predetermined low altitude reference point, second switch means for starting said motor means sluing said plate and encoder upwardly from said reference point and activating said second light source means and second light-responsive means to find said foot marker, and third switch means responsive to said second light-responsive means to stop such upward sluing when said foot marker is found and to reactivate said first mentioned light source means and light-responsive means so that they can track said 100 foot pointer.

15. The invention of claim 13 in which said circuit means includes switch means for starting said motor means sluing said plate and encoder upwardly from said reference point and activating said second light source means and second light-responsive means to find said foot marker.

16. The invention of claim 13 in which said circuit means includes switch means responsive to said second-light responsive means when said foot marker is found to stop the driving of said plate and to activate said first mentioned light source means and light-responsive means so that they can track said 100 foot pointer.

17. For use with a conventional altimeter having a 100 foot pointer and a foot marker, both revolvable about the axis of said altimeter, an encoding system including an encoder having an input shaft, a support plate journalled for rotation about said axis adjacent the pointer and foot marker, motor means for driving said input shaft and said support plate, first electro-optical means for tracking movement of the 100 foot pointer, said first electro-optical means being carried by said support plate for movement therewith to track the pointer, a support bracket mounted for rotation about said axis adjacent said pointer and foot marker, gear reduction means drivingly connecting said bracket to said motor means for movement when said support plate moves, such movement corresponding to the movement of the foot marker, and second electro-optical means for finding said foot marker, said second electro-optical means being carried by said bracket for movement therewith, said first electro-optical means dominating said motor means during the tracking of said pointer and said second electro-optical means dominating said motor means while finding said foot marker.

18. The invention of claim 17 in which said second electro-optical means includes light source means for projecting light at the path of movement of the foot marker and light-responsive means for receiving light reflected from said foot marker.

19. The invention of claim 17 including first switch means for deactivating said first electro-optical means to stop the tracking operation and start said motor means sluing said plate and encoder downwardly to a predetermined low altitude reference point, second switch means for starting said motor means sluing said plate and encoder upwardly from said reference point and activating said second electro-optical means to find the foot marker, and third switch means responsive to said second electro-optical means to stop such upward sluing when the foot marker is found and to reactivate said first electro-optical means for the tracking operation.

20. An altitude encoding system comprising a conventional altimeter having a 100 foot pointer, and a pointer conventionally known as the foot marker, both movable about the axis of said altimeter, first electro-optical means for tracking said 100 foot pointer, second electro-optical means for finding said foot marker, said electro-optical means including, respectively, first and second support means mounted for rotation about said altimeter axis, and first and second light cell means mounted, respectively, on said support means, motor means for driving said first support means, reduction means drivingly connecting said second support means to said first support means whereby the movement of said second support means corresponds to movement of said foot marker while the movement of said first support means corresponds to movement of said 100 foot pointer, and control means for said motor means, said control means including first means for operatively connecting said motor means to said first light cell means, second means for operatively connecting said motor means to said second light cell means, and means for transferring control of said motor means between said first and second means.

* * * * *

UNITED STATES PATENT OFFICE
CERTIFICATE OF CORRECTION

Patent No. 3,815,420　　　　　　　Dated　June 11, 1974

Inventor(s) Earl W. Springer

It is certified that error appears in the above-identified patent and that said Letters Patent are hereby corrected as shown below:

Column 9, line 35, "401" should be -- 410 --.
Column 10, line 58 (Claim 1, line 18), should read
-- cent said pointers, second light source means and sec- --.

Signed and sealed this 1st day of October 1974.

(SEAL)
Attest:

McCOY M. GIBSON JR.　　　　　　　　C. MARSHALL DANN
Attesting Officer　　　　　　　　　　Commissioner of Patents